United States Patent
Kuroda et al.

(10) Patent No.: US 7,512,410 B2
(45) Date of Patent: Mar. 31, 2009

(54) ASSIGNMENT OF TOKEN TO PTT COMMUNICATIONS

(75) Inventors: Yuri Kuroda, Tokyo (JP); Hiroshi Yoshimachi, Tokyo (JP)

(73) Assignee: NEC Corporation, Tokyo (JP)

( * ) Notice: Subject to any disclaimer, the term of this patent is extended or adjusted under 35 U.S.C. 154(b) by 283 days.

(21) Appl. No.: 11/194,797

(22) Filed: Aug. 2, 2005

(65) Prior Publication Data

US 2006/0040688 A1 Feb. 23, 2006

(30) Foreign Application Priority Data

Aug. 11, 2004 (JP) ............................. 2004-234530

(51) Int. Cl.
*H04B 7/00* (2006.01)
(52) U.S. Cl. .................. 455/518; 455/414.2; 455/414.3
(58) Field of Classification Search ................ 455/507, 455/517–520, 404.1, 404.2, 456.1, 455, 456.3, 455/456.6, 90.2, 414.1, 414.2, 414.3, 450; 370/260, 390, 432
See application file for complete search history.

(56) References Cited

U.S. PATENT DOCUMENTS

| | | | |
|---|---|---|---|
| 6,765,528 B2 * | 7/2004 | Tranchina et al. ........ 342/357.1 |
| 6,941,147 B2 * | 9/2005 | Liou ........................ 455/456.5 |
| 6,950,627 B2 * | 9/2005 | Vicari ........................ 455/41.2 |
| 7,107,017 B2 * | 9/2006 | Koskelainen et al. ....... 455/90.2 |
| 7,170,863 B1 * | 1/2007 | Denman et al. ............. 370/260 |
| 7,239,623 B2 * | 7/2007 | Burghardt et al. ........... 370/338 |
| 2004/0221045 A1 * | 11/2004 | Joosten et al. .............. 709/227 |
| 2004/0249949 A1 * | 12/2004 | Gourraud et al. ........... 709/227 |
| 2005/0038913 A1 * | 2/2005 | Yasuda ....................... 709/248 |
| 2006/0031294 A1 * | 2/2006 | Poikselka .................... 709/204 |

FOREIGN PATENT DOCUMENTS

| | | |
|---|---|---|
| JP | H03-289725 | 12/1991 |
| JP | H07-074669 | 3/1995 |
| JP | 2000-209147 | 7/2000 |
| WO | WO-97/50267 | 12/1997 |
| WO | WO-00/47005 | 8/2000 |
| WO | WO-01/67674 A2 | 9/2001 |
| WO | WO 2004/081732 A3 | 9/2004 |
| WO | WO 2004/086715 A1 | 10/2004 |

* cited by examiner

*Primary Examiner*—Alexander Eisen
*Assistant Examiner*—Anthony S Addy
(74) *Attorney, Agent, or Firm*—Dickstein, Shapiro, LLP.

(57) ABSTRACT

A PTT communication system includes a plurality of terminals having respective PTT buttons, a management server for managing advertisements or contents, and a PTT communication server for controlling a token for PTT communications. When the PTT button of either one of the terminals is pressed, the PTT communication server assigns a token to the terminal with the pressed PTT button, and sends communication data from the terminal with the pressed PTT button to another terminal. When the PTT button of any one of the terminals is not pressed, the PTT communication server assigns a token to the management server which is equipped with no PTT button, and distributes advertisements or contents selected by the management server to which the token is assigned to the terminals.

21 Claims, 8 Drawing Sheets

ASSIGNMENT OF TOKEN TO PTT COMMUNICATIONS

BACKGROUND OF THE INVENTION

1. Field of the Invention

The present invention relates to a PTT (Push-To-Talk) communication system for performing PTT communications, a PTT communication method, and a PTT communication server.

2. Description of the Related Art

In recent years, there have been proposed many PTT communication systems for performing PTT communications using terminals (see, for example, JP-A-07-074669). Of the PTT communication systems, a PTT communication system which employs cellular phones as terminals is referred to as a POC (PTT Over Cellular) communication system.

In the PTT communication system, when a user belonging to a certain group wants to begin a PTT communication session, the user logs in a PTT communication server with its own terminal, confirms another terminal belonging to the same group, and requests the other terminal to join the PTT communication session through the PTT communication server. If the other terminal agrees to join the PTT communication session in response to the request, then the requesting terminal and the joining terminal participate in the PTT communication session and start transmitting communication data to each other. PTT communication services allow a single terminal to communicate with another single terminal and also allow a single terminal to communicate simultaneously with a plurality of (N) terminals.

In a PTT communication session, when a user presses the PTT button of its own terminal to obtain a token, i.e., a right to speak or communicate, from the PTT communication server, only that user can send communication data, i.e., audio and/or video data, from its terminal through the PTT communication server to another terminal or other terminals, just like using a transceiver. When the user with the token releases the PTT button and another user presses the PTT button of its own terminal, the other user who is pressing the PTT button obtains a token from the PTT communication server.

According to the conventional PTT communication systems, only terminals equipped with PTT buttons can join PTT communication sessions, and servers that are not equipped with PTT buttons are not allowed to join PTT communication sessions.

SUMMARY OF THE INVENTION

It is therefore an object of the present invention to provide a PTT communication system, a PTT communication method, and a PTT communication server, which allow servers that are not equipped with PTT buttons to join PTT communication sessions.

According to a first aspect of the present invention, a PTT communication system includes a plurality of terminals having respective PTT buttons for obtaining a token for PTT communications, a management server for managing advertisements or contents, and a PTT communication server for controlling a token for PTT communications.

The PTT communication server has a terminal state monitoring means, a token control means, and a distribution control means.

The terminal state monitoring means monitors pressed states of the PTT buttons of the respective terminals. The token control means assigns a token to one of the terminals whose PTT button is pressed and sending communication data transmitted from the terminal whose PTT button is pressed, to another one of the terminals, when the PTT button of the one of the terminals is pressed. The token control means assigns a token to the management server when the PTT button of any one of the terminals is not pressed. The distribution control means distributes advertisements or contents selected by the management server to the terminals when the token control means assigns a token to the management server.

With the above arrangement, when the PTT button of any one of the terminals is not pressed, a token is assigned to the management server which is equipped with no PTT button, and advertisements or contents selected by the management sever are distributed to the terminals. Therefore, the management server which is equipped with no PTT button can join PTT communications.

According to a second aspect of the present invention, a PTT communication system includes a plurality of terminals having respective PTT buttons for obtaining a token for PTT communications, an interphone installed in a predetermined location, and a PTT communication server for controlling a token for PTT communications.

The PTT communication server has a terminal state monitoring means and a token control means.

The terminal state monitoring means monitors pressed states of the PTT buttons of the respective terminals. The token control means assigns a token to one of the terminals whose PTT button is pressed and sends communication data transmitted from the terminal whose PTT button is pressed, to another one of the terminals, when the PTT button of the one of the terminals is pressed. The token control means assigns a token to the interphone and sends communication data transmitted from the interphone to the terminals, when the PTT button of any one of the terminals is not pressed.

With the above arrangement, when the PTT button of any one of the terminals is not pressed, a token is assigned to the interphone which is equipped with no PTT button, and communication data from the interphone are distributed to the terminals. Therefore, the interphone which is equipped with no PTT button can join PTT communications.

The above and other objects, features, and advantages of the present invention will become apparent from the following description with reference to the accompanying drawings which illustrate examples of the present invention.

DESCRIPTION OF THE PREFERRED EMBODIMENTS

1st Embodiment

Figure 1:
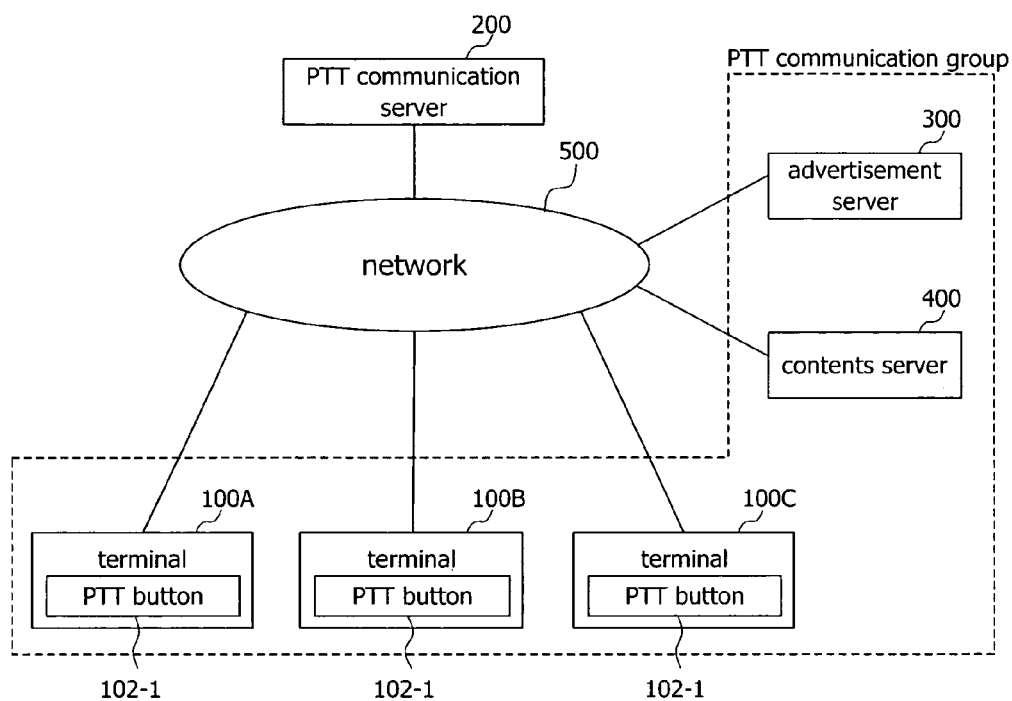
FIG. 1 is a block diagram of a PTT communication system according to a first embodiment of the present invention.

As shown in FIG. 1, a PTT communication system according to a first embodiment of the present invention comprises a plurality of terminals 100A through 100C each equipped with PTT button 102-1, PTT communication server 200, advertisement server 300, contents server 400, and network 500 interconnecting the terminals and the servers. In FIG. 1, the PTT communication system has two servers, i.e., advertisement server 300 and contents server 400. However, the PTT communication system may have either one of advertisement server 300 and contents server 400 as a management server. In FIG. 1, terminals 100A through 100C, advertisement server 300, contents server 400 jointly make up a PTT communication group in which they perform PTT communications with each other.

Terminals 100A through 100C comprise cellular phones or the like which are used by respective users to perform PTT communications. Each of terminals 100A through 100C has PTT button 102-1 that is pressed by the user to obtain a token.

When the PTT button 102-1 of either one of terminals 100A through 100C is pressed, PTT communication server 200 assigns a token to the terminal with pressed PTT button 102-1 until the PTT button 102-1 is released, and transmits communication data, i.e., audio and/or video data, from the terminal with pressed PTT button 102-1 to another terminal through network 500. When the PTT button 102-1 of any one of terminals 100A through 100C is not pressed, PTT communication server 200 assigns a token to advertisement server 300 or contents server 400, and distributes advertisements or contents comprising audio and/or video data, which are selected by advertisement server 300 or contents server 400, to terminals 100A through 100C through network 500.

Advertisement server 300 manages advertisements to be distributed from PTT communication server 200 through network 500 to terminals 100A through 100C. Advertisement server 300 is not equipped with a PTT button.

Contents server 400 manages contents to be distributed from PTT communication server 200 through network 500 to terminals 100A through 100C. Contents refer to general data such as of music, still images, moving images, games, etc. that can be distributed to terminals 100A through 100C. Contents server 400 is not equipped with a PTT button.

Internal details of terminals 100A through 100C, PTT communication server 200, advertisement server 300, contents server 400 will be described below with reference to FIGS. 2 through 5.

Figure 2:
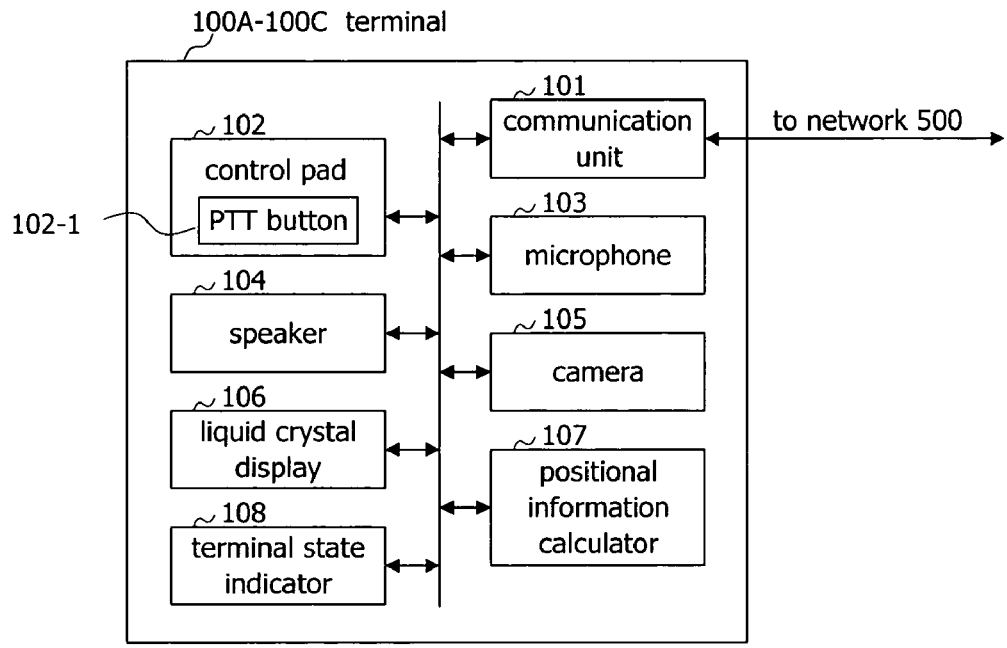
FIG. 2 is a block diagram of each of the terminals of the PTT communication system shown in FIG. 1.

As shown in FIG. 2, each of terminals 100A through 100C has communication unit 101, control pad 102 comprising input keys including PTT button 102-1, microphone 103, speaker 104, camera 105, liquid crystal display unit 106, positional information calculator 107, and terminal state indicator 108.

Communication unit 101 serves as an interface with network 500.

PTT button 102-1 is pressed by the user when the user wants to have a token, i.e., a right to speak or communicate. Microphone 103 serves to pick up sounds. Speaker 104 serves to radiate sounds. Camera 105 serves to capture images. Liquid crystal display unit 106 serves to display images. When terminal 100A has a token, then images captured by camera 105 and sounds picked up by microphone 103 are transmitted as communication data from communication unit 101 through network 500 to terminals 100B, 100C that belong to the PTT communication group. When another device (terminal 100B, terminal 100C, advertisement server 300, or contents server 400) belonging to the PTT communication group has a token, terminal 100A outputs images and sounds that are received as communication data from the other device through network 500, from liquid crystal display unit 106 and speaker 104.

Positional information calculator 107 calculates positional information as to the latitude and longitude of the present position. Positional information calculator 107 may calculate positional information according to a known process. For example, positional information calculator 107 may calculate positional information of the present position based on GPS (Global Positioning System) data received from GPS satellites, or based on distance data between the terminal and a radio base station (not shown).

Terminal state indicator 108 sends information as to the state of its own terminal, i.e., information as to whether PTT button 102-1 is pressed or not, positional information calculated by positional information calculator 107, etc. from communication unit 101 through network 500 to PTT communication server 200.

Figure 3:
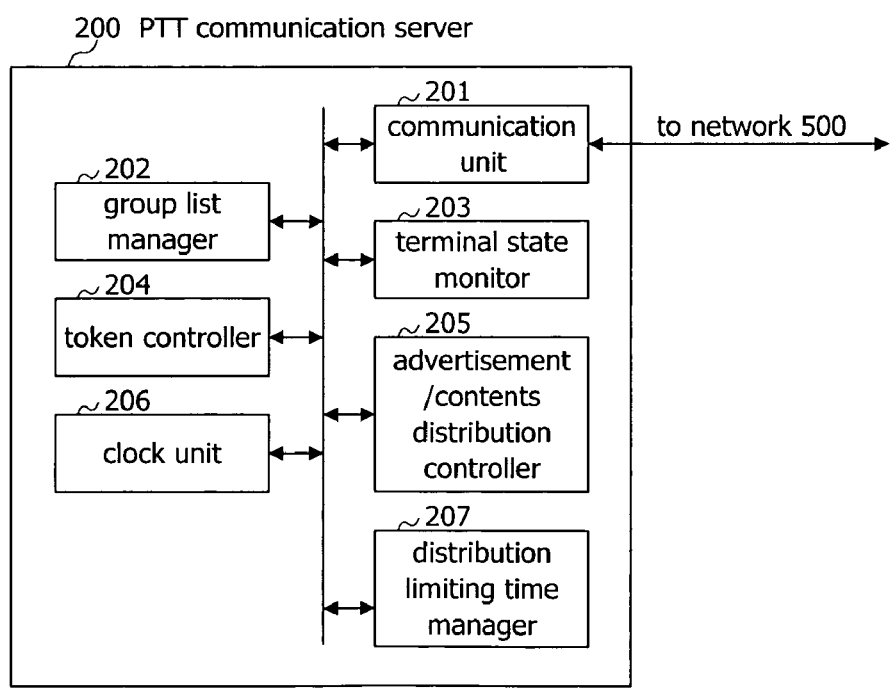
FIG. 3 is a block diagram of a PTT communication server of the PTT communication system shown in FIG. 1.

As shown in FIG. 3, PTT communication server 200 has communication unit 201, group list manager 202, terminal state monitor 203, token controller 204, advertisement/contents distribution controller 205, clock unit 206, and distribution limiting time manager 207.

Communication unit 201 serves as an interface with network 500.

Group list manager 202 serves to manage a group list of the PTT communication group and to add terminals, servers, etc. to the PTT communication group and delete terminals, servers, etc. from the PTT communication group. Group list manager 202 also manages information as to the profiles (name, age, gender, favorites, job, etc.) of the users who uses terminals 100A through 100C, information as to whether the users permit advertisements to be distributed or not, information as to whether the users permit contents to be distributed or not, information as to which of advertisements and contents the users wants to be distributed, and other information. Other components of PTT communication server 200 determine terminals 100A through 100C, advertisement server 300, and contents server 400 which belong to the communication group based on the information managed by group list manager 202.

Terminal state monitor 203 monitors states of terminals 100A through 100C, i.e., whether PTT buttons 102-1 of terminals 100A through 100C are pressed or not, and the present positions of terminals 100A through 100C, based on information transmitted from terminal state indicators 108 of terminals 100A through 100C through network 500 to communication unit 201.

Token controller 204 judges whether PTT button 102-1 of either one of terminals 100A through 100C belonging to the PTT communication group is pressed or not, based on the states of terminals 100A through 100C monitored by terminal state monitor 203, and controls a token based on the judgement.

For example, when PTT button 102-1 of terminal 100A is pressed, token controller 204 assigns a token to terminal 100A until PTT button 102-1 thereof is released. While PTT button 102-1 of terminal 100A is being pressed, PTT communication server 200 transmits communication data sent from terminal 100A through network 500 to terminals 100B, 100C through network 500, and inhibits terminals 100B, 100C from sending communication data.

When PTT button 102-1 of any one of terminals 100A through 100C is not pressed, token controller 204 assigns a token to advertisement server 300 or contents server 400, and notifies advertisement/contents distribution controller 205 of the assignment of the token to advertisement server 300 or contents server 400. If either one of advertisement server 300 and contents server 400 belongs to the PTT communication group, then token controller 204 selects the server belonging to the PTT communication group and assigns a token to the selected server. However, if both advertisement server 300 and contents server 400 belong to the PTT communication server as shown in FIG. 1, then token controller 204 determines whether the user of each of terminals 100A through 100C wants to have advertisements or contents distributed, based on the information managed by group list manager 202, determines whether the number of users who want to have advertisements distributed or the number of users who want to have contents distributed is greater, and selects the server favored by more users. If the number of users who want to have advertisements distributed and the number of users who want to have contents distributed are equal to each other, then token controller 204 determines one of the servers in advance, and selects the determined server. Alternatively, token controller 204 asks, through communication units 101, the users of terminals 100A through 100C about which of advertisements and contents the users want to have distributed, determines whether the number of users who want to have advertisements distributed or the number of users who want to have contents distributed is greater, and selects the server favored by more users. If the number of users who want to have advertisements distributed and the number of users who want to have contents distributed are equal to each other, then token controller 204 determines one of the servers in advance, and selects the determined server.

When advertisement/contents distribution controller 205 is notified of the assignment of a token to advertisement server 300 or contents server 400 by token controller 204, advertisement/contents distribution controller 205 sends information for use as a basis for selecting optimum advertisements or contents for the users of terminals 100A through 100C from communication unit 201 through network 500 to advertisement server 300 or contents server 400 to which the token is assigned. The information for use as a basis for selecting optimum advertisements or contents for the users of terminals 100A through 100C is the information of the user profiles managed by group list manager 202 and the positional information of terminals 100A through 100C monitored by terminal state monitor 203.

When advertisements or contents selected by advertisement server 300 or contents server 400 to which the token is assigned are sent through network 500 to communication unit 201, advertisement/contents distribution controller 205 distributes the selected advertisements or contents from communication unit 201 through network 500 to terminals 100A through 100C. The advertisements or contents distributed to terminals 100A through 100C may be selected commonly for individual terminals 100A through 100C or may be selected individually for individual terminals 100A through 100C.

Distribution limiting time manager 207 manages distribution limiting times at which the distribution of advertisements or contents to terminals 100A through 100C is to be limited. The distribution limiting times for advertisements or contents may be times that are individually set by the users of terminals 100A through 100C, using terminals 100A through 100C. Alternatively, the distribution limiting times for advertisements may be times that are set by advertisement providers using advertisement server 300, and the distribution limiting times for contents may be times that are set by contents providers using contents server 400.

When advertisements or contents are distributed to terminals 100A through 100C, advertisement/contents distribution controller 205 refers to the present time managed by clock unit 206 and the distribution limiting times managed by distribution limiting time manager 207, and limits the distribution of advertisements or contents if the present time corresponds to the distribution limiting times. If the present time corresponds to the distribution limiting time of either one of terminals 100A through 100C, then advertisement/contents distribution controller 205 does not distribute advertisements or contents to that one terminal, but distributes advertisements or contents to the other terminals. When advertisement server 300 has a token, if the present time corresponds to the distribution limiting time for advertisements, then advertisement/contents distribution controller 205 does not distribute advertisements to any one of terminals 100A through 100C.

Figure 4:
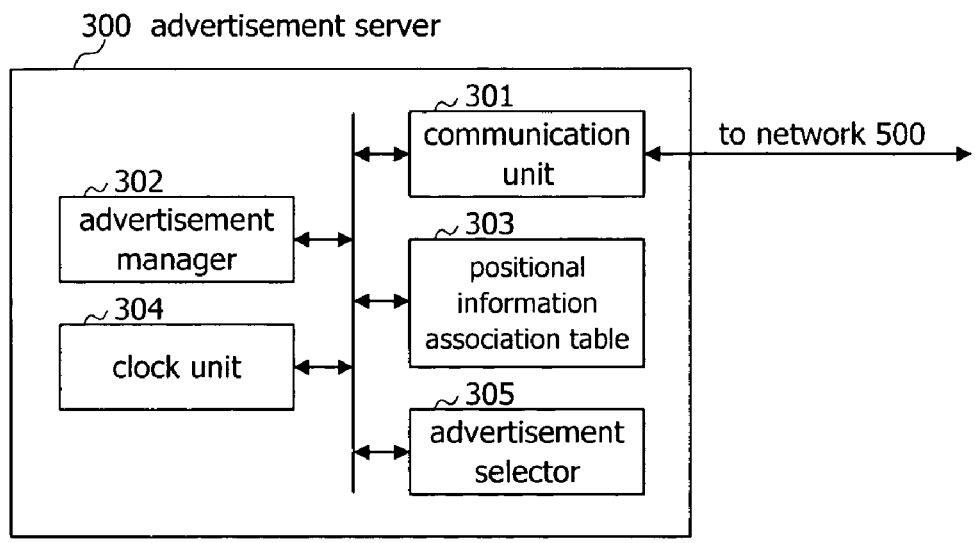
FIG. 4 is a block diagram of an advertisement server of the PTT communication system shown in FIG. 1.

As shown in FIG. 4, advertisement server 300 has communication unit 301, advertisement manager 302, positional information association table 303, clock unit 304, and advertisement selector 305.

Communication unit 301 serves as an interface with network 500.

Advertisement manager 302 serves to manage advertisements to be distributed to terminals 100A through 100C and information about those advertisements. If advertisements are related to articles of merchandise, then the information about the advertisements represents images (still images or moving images) showing details of the articles of merchandise, e.g., specifications, how to use, etc.

Positional information association table 303 is a table representing an association between positional information, e.g., latitude xxx and longitude yyy, that is sent from advertisement/contents distribution controller 205 of PTT communication server 200 through network 500 to communication unit 301, and locations, e.g., movie theater Z, specified by the positional information.

Advertisement selector 305 selects optimum advertisements to be distributed to terminals 100A through 100C, based on at least one of the information as to the profiles of the users using terminals 100A through 100C, the positional information of terminals 100A through 100C, and the information of the present time managed by clock unit 304, which information is sent from advertisement/contents distribution controller 205 of PTT communication server 200 through network 500 to communication unit 301, and sends the selected advertisements and information about the selected advertisements from communication unit 301 through network 500 to PTT communication server 200. The advertisements transmitted to PTT communication server 200 may be selected commonly for individual terminals 100A through 100C or may be selected individually for individual terminals 100A through 100C. Furthermore, the advertisements transmitted to PTT communication server 200 may include advertisements in their entirety or may be customized to include only a portion thereof.

Figure 5:
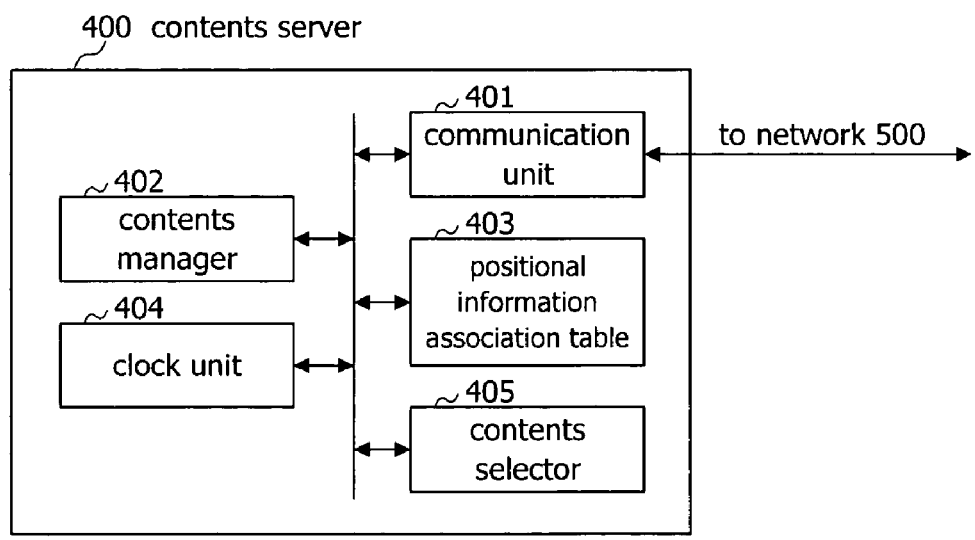
FIG. 5 is a block diagram of a contents server of the PTT communication system shown in FIG. 1.

As shown in FIG. 5, contents server 400 has communication unit 401, contents manager 402, positional information association table 403, clock unit 404, and contents selector 405.

Communication unit 401 serves as an interface with network 500.

Contents manager 402 serves to manage contents to be distributed to terminals 100A through 100C and information about those contents. If contents are related to music, then the information about the contents represents information representing music titles and artist's name, and artist's images (still images or moving images).

Positional information association table 403 is a table representing an association between positional information that is sent from advertisement/contents distribution controller 205 of PTT communication server 200 through network 500 to communication unit 401, and locations specified by the positional information.

Contents selector 405 selects optimum contents to be distributed to terminals 100A through 100C, based on at least one of the information as to the profiles of the users using terminals 100A through 100C, the positional information of terminals 100A through 100C, and the information of the present time managed by clock unit 404, which information is sent from advertisement/contents distribution controller 205 of PTT communication server 200 through network 500 to communication unit 401, and sends the selected contents and information about the selected contents from communication unit 401 through network 500 to PTT communication server 200. The contents transmitted to PTT communication server 200 may be selected commonly for individual terminals 100A through 100C or may be selected individually for individual terminals 100A through 100C. Furthermore, the contents transmitted to PTT communication server 200 may include contents in their entirety or may be customized to include only a portion thereof.

Figure 6:
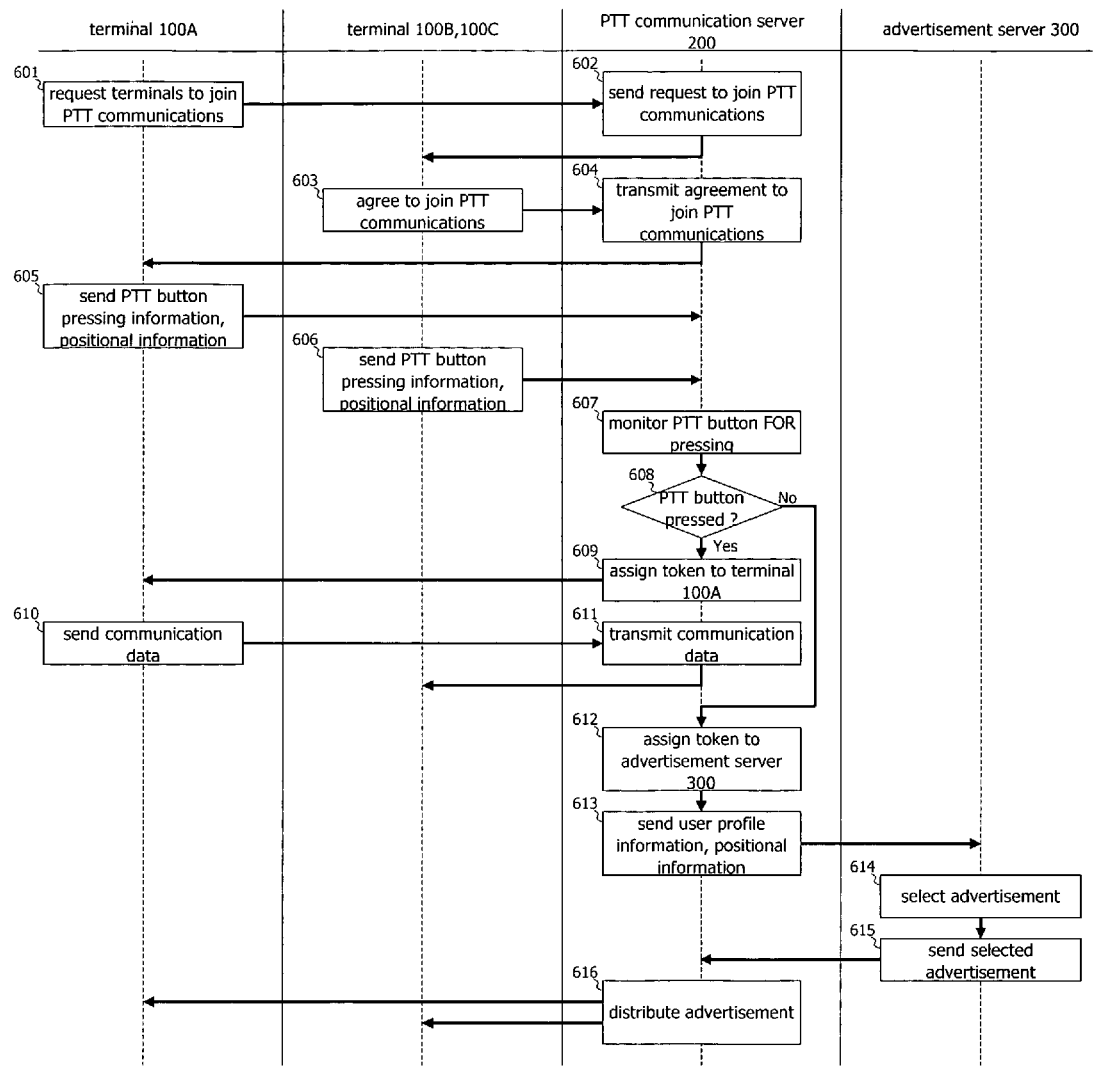
FIG. 6 is a flowchart of an operation sequence of the PTT communication system shown in FIG. 1.

Operation of the PTT communication system according to the first embodiment will be described below with reference to a flowchart shown in FIG. 6. It is assumed that group list manager 202 of PTT communication server 200 has already been managing the list of the PTT communication group including terminals 10A through 100C, advertisement server 300, and contents server 400, and the profile information of the users using terminals 100A through 100C. An operation sequence for starting a PTT communication session when terminal 100A requests terminals 100B, 100C to join PTT communications will be described below.

First, in response to a control action made by the user through control pad 102, terminal 100A logs on PTT communication server 200 through network 500, and confirms other terminals 100B, 100C belonging to the PTT communication group. In step 601 shown in FIG. 6, terminal 100A requests terminals 100B, 100C through PTT communication server 200 to join PTT communications. In step 602, the request for joining PTT communications is transmitted to terminals 100B, 100C by token controller 204 of PTT communication server 200.

Upon the request, terminals 100B, 100C agree to terminal 100A to join PTT communications through PTT communication server 200, in response to a control action made by the user through control pad 102, in step 603. The agreement to join PTT communications is transmitted to terminal 100A by token controller 204 of PTT communication server 200 in step 604.

Thereafter, terminals 100A through 100C start a PTT communication session.

While terminals 100A through 100C are performing PTT communications, terminal state indicators 108 of terminals 100A through 100C send information as to whether PTT buttons 102-1 are being pressed or not and positional information of terminals 100A through 100C which is calculated by positional information calculators 107, through network 500 to PTT communication server 200 in steps 605, 606.

In step 607, terminal state monitor 203 of PTT communication server 200 monitors whether PTT button 102-1 of either one of terminals 100A through 100C is pressed or not, based on the information as to pressing of PTT button 102-1 which is received from each of terminals 100A through 100C through network 500.

It is assumed in step 608 that PTT button 102-1 of terminal 100A is pressed. Token controller 204 of PTT communication server 200 assigns a token to terminal 100A until PTT button 102-1 thereof is released in step 609. Subsequently, communication data transmitted from terminal 100A through network 500 in step 610 are transmitted through network 500 to terminals 100B, 100C in step 610. Terminals 100B, 100C are inhibited from transmitting communication data.

If PTT button 102-1 of any one of terminals 100A through 100C is not pressed, then token controller 204 of PTT communication server 200 assigns a token to advertisement server 300 or contents server 400 in step 612.

At this time, token controller 204 assigns a token to advertisement server 300 or contents server 400 in the manner as described above. It is assumed here that token controller 204 assigns a token to advertisement server 300. In step 613, advertisement/contents distribution controller 205 of PTT communication server 200 sends the information of the user profiles managed by group list manager 202 and the positional information of terminals 100A through 100C monitored by terminal state monitor 203 to advertisement server 300 to which the token is assigned.

In step 614, advertisement selector 305 of advertisement server 300 selects optimum advertisements based on at least one of the information as to the profiles of the users using terminals 100A through 100C, the positional information of terminals 100A through 100C, and the information of the present time managed by clock unit 304, which information is received from PTT communication server 200 through network 500. Advertisement selector 305 sends the selected advertisements and information about the selected advertisements through network 500 to PTT communication server 200 in step 615. The advertisements transmitted to PTT communication server 200 may be selected commonly for individual terminals 100A through 100C or may be selected individually for individual terminals 100A through 100C. Furthermore, the advertisements transmitted to PTT communication server 200 may include advertisements in their entirety or may be customized to include only a portion thereof.

Thereafter, in step 616, advertisement/contents distribution controller 205 of PPT communication server 200 distributes the advertisements selected by advertisement server 300 and sent from advertisement server 300 through network 500 to terminals 100A through 100C through network 500. If the present time managed by clock unit 206 corresponds to the distribution limiting times managed by distribution limiting time manager 207, then advertisement/contents distribution controller 205 limits the distribution of the advertisements. For example, if the present time corresponds to the distribution limiting time of terminal 100A, then advertisement/contents distribution controller 205 does not distribute the advertisements to terminal 100A, but distributes advertisements to other terminals 100B, 100C. If the present time corresponds to distribution limiting times of the advertisements themselves, then advertisement/contents distribution controller 205 does not distribute the advertisements to any one of terminals 100A through 100C.

When a token is assigned to contents server 400 while PTT button 102-1 of any one of terminals 100A through 100C is not being pressed, the PTT communication system operates in the same manner as described above except that advertisement server 300 is replaced with contents server 400 and contents managed by contents server 400 are distributed.

According to the first embodiment, as described above, while PTT button 102-1 of any one of terminals 100A through 100C is not being pressed, a token is assigned to advertisement server 300 or contents server 400 that is equipped with no PTT button, and advertisements or contents selected by advertisement server 300 or contents server 400 are distributed to terminals 100A through 100C. Consequently, advertisement server 300 or contents server 400 that is equipped with no PTT button can join PTT communications.

2nd Embodiment

Figure 7:
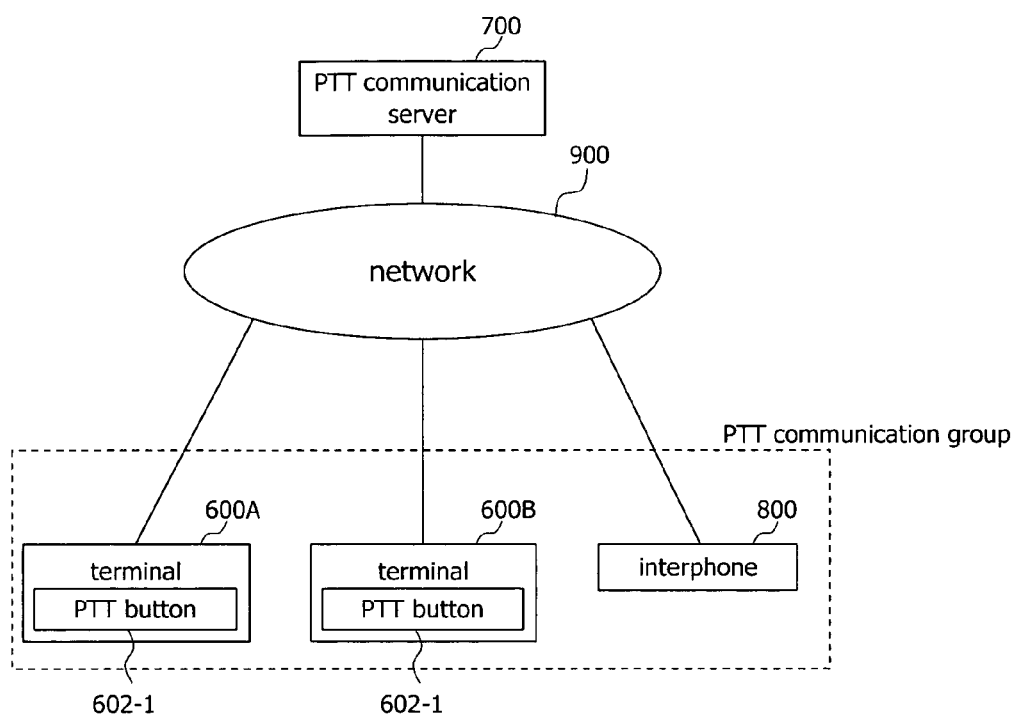
FIG. 7 is a block diagram of a PTT communication system according to a second embodiment of the present invention.

As shown in FIG. 7, a PTT communication system according to a second embodiment of the present invention comprises terminals 600A, 600B each equipped with PTT button 602-1, PTT communication server 700, interphone 800, and network 900 interconnecting them. The PTT communication system according to the second embodiment differs from the PTT communication system according to the first embodiment in that interphone 800 is provided in place of advertisement server 300 and contents server 400. In FIG. 7, terminals 600A, 600B and interphone 800 jointly make up a PTT communication group in which they perform PTT communications with each other.

Terminals 600A, 600B comprise cellular phones or the like which are used by respective users to perform PTT communications. In the second embodiment, the users using terminals 600A, 600B are specifically residents living in residences such as condominiums, apartments, independent houses, etc.

When the PTT button 602-1 of either one of terminals 600A, 600B is pressed, PTT communication server 700 assigns a token to the terminal with pressed PTT button 602-1 until PTT button 602-1 is released, and transmits communication data, i.e., audio and/or video data, from the terminal with pressed PTT button 602-1 to another terminal through network 900. When PTT button 602-1 of any one of terminals 600A, 600B is not pressed, PTT communication server 700 assigns a token to interphone 800, and transmits communication data comprising audio and/or video data from interphone 800 to terminals 600A, 600B through network 900.

Interphone 800 is installed in a residence such as a condominium, an apartment, an independent house, or the like, and is used by a visitor to the residence. Specifically, interphone 800 is installed in either one of the locations (1), (2) described below. Interphone 800 is not equipped with a PTT button.

(1) The lobby of a condominium with an automatic lock system.

(2) The entrance of a condominium, an apartment, or an independent house without an automatic lock system.

Internal details of terminals 600A, 600C, PTT communication server 700, and interphone 800 will be described below with reference to FIGS. 8 through 10.

Figure 8:
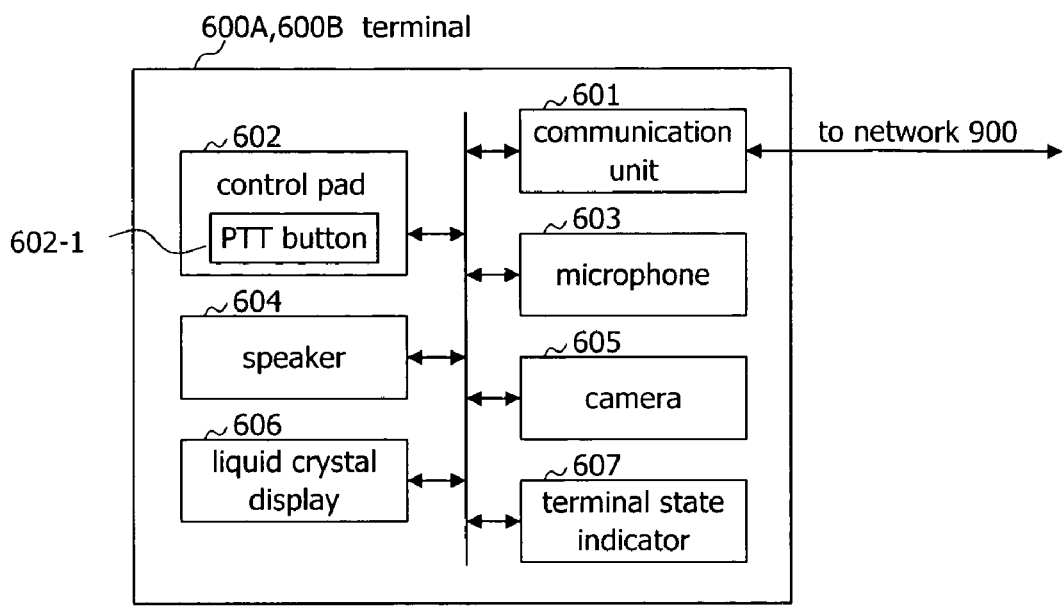
FIG. 8 is a block diagram of each of the terminals of the PTT communication system shown in FIG. 7.

As shown in FIG. 8, each of terminals 600A, 600B has communication unit 601, control pad 602 comprising input keys including PTT button 602-1, microphone 603, speaker 604, camera 605, liquid crystal display unit 606, and terminal state indicator 607.

Communication unit 101 serves as an interface with network 900.

PTT button 602-1 is pressed by the user when the user wants to have a token, i.e., a right to speak or communicate. Microphone 603 serves to pick up sounds. Speaker 604 serves to radiate sounds. Camera 605 serves to capture images. Liquid crystal display unit 606 serves to display images.

When terminal 600A has a token, then images captured by camera 605 and sounds picked up by microphone 603 are transmitted as communication data from communication unit 601 through network 900 to terminal 600B that belongs to the PTT communication group. When another device (terminal 600B or interphone 800) belonging to the PTT communication group has a token, terminal 600A outputs images and sounds that are received as communication data from the other device through network 900, from liquid crystal display unit 606 and speaker 604.

Terminal state indicator 607 sends information as to the state of its own terminal, i.e., information as to whether PTT button 602-1 is pressed or not, etc. from communication unit 601 through network 900 to PTT communication server 700.

Figure 9:
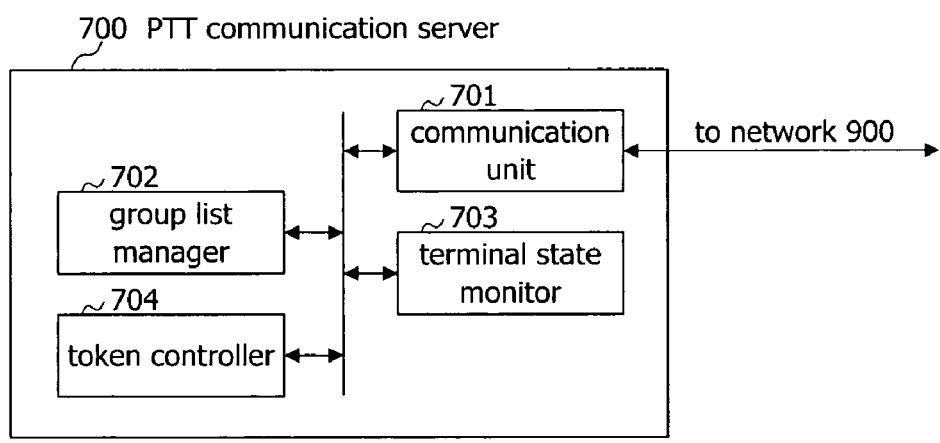
FIG. 9 is a block diagram of a PTT communication server of the PTT communication system shown in FIG. 7.

As shown in FIG. 9, PTT communication server 700 has communication unit 701, group list manager 702, terminal state monitor 703, and token controller 704.

Communication unit 701 serves as an interface with network 900.

Group list manager 702 serves to manage a group list of the PTT communication group and to add terminals, servers, etc. to the PTT communication group and delete terminals, servers, etc. from the PTT communication group. Other components of PTT communication server 700 determine terminals 600A, 600B and interphone 800 which belong to the communication group based on the information managed by group list manager 702.

Terminal state monitor 703 monitors states of terminals 600A, 600B, i.e., whether PTT buttons 602-1 of terminals 600A, 600B are pressed or not, based on information transmitted from terminal state indicators 607 of terminals 600A, 600B through network 900 to communication unit 701.

Token controller 704 judges whether PTT button 602-1 of either one of terminals 600A, 600B is pressed or not, based on the states of terminals 600A, 600B monitored by terminal state monitor 703, and controls a token based on the judgement.

For example, when PTT button 602-1 of terminal 600A is pressed, token controller 704 assigns a token to terminal 600A until PTT button 602-1 thereof is released. While PTT button 602-1 of terminal 600A is being pressed, PTT communication server 700 transmits communication data sent from terminal 600A through network 900 to terminal 600B through network 900, and inhibits terminal 600B from sending communication data.

When PTT button 602-1 of any one of terminals 600A, 600B is not pressed, token controller 704 assigns a token to interphone 800. PTT communication server 700 transmits communication data sent from interphone 800 through network 900 to terminals 600a, 600B through network 900, and inhibits terminals 600A, 600B from sending communication data.

Figure 10:
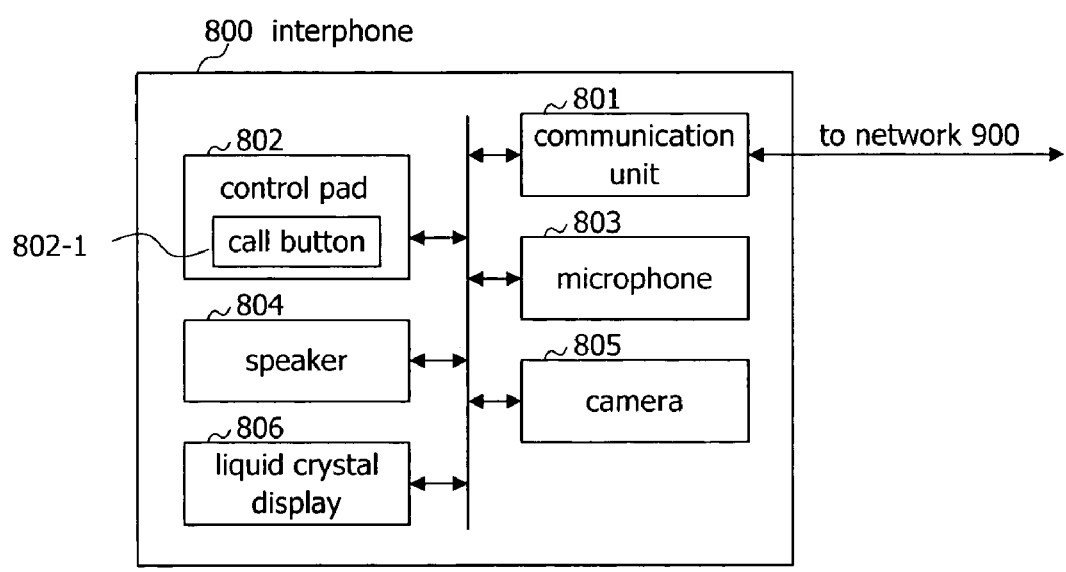
FIG. 10 is a block diagram of an interphone of the PTT communication system shown in FIG. 7.

As shown in FIG. 10, interphone 800 has communication unit 801, control pad 802 comprising input keys including call button 802-1, microphone 803, speaker 804, camera 805, and liquid crystal display unit 806.

Communication unit 801 serves as an interface with network 900.

Call button 802-1 is pressed by a visitor to the residence. As described in detail later, when call button 802-1 is pressed, it triggers token controller 704 of PTT communication server 700 to request terminals 600A, 600B to join PTT communications. When terminals 600A, 600B agree to join PTT communications, a PTT communication session is started. Microphone 803 serves to pick up sounds. Speaker 804 serves to radiate sounds. Camera 805 serves to capture images. Liquid crystal display unit 806 serves to display images. When interphone 800 has a token, interphone 800 sends images captured by camera 605 and sounds picked up by microphone 603 as communication data from communication unit 801 through network 900 to terminals 600a, 600B that belong to the PTT communication group. When another device (terminal 600A or 600B) belonging to the PTT communication group has a token, interphone 800 outputs images and sounds that are received as communication data from the other device through network 900, from liquid crystal display unit 806 and speaker 804.

Figure 11:
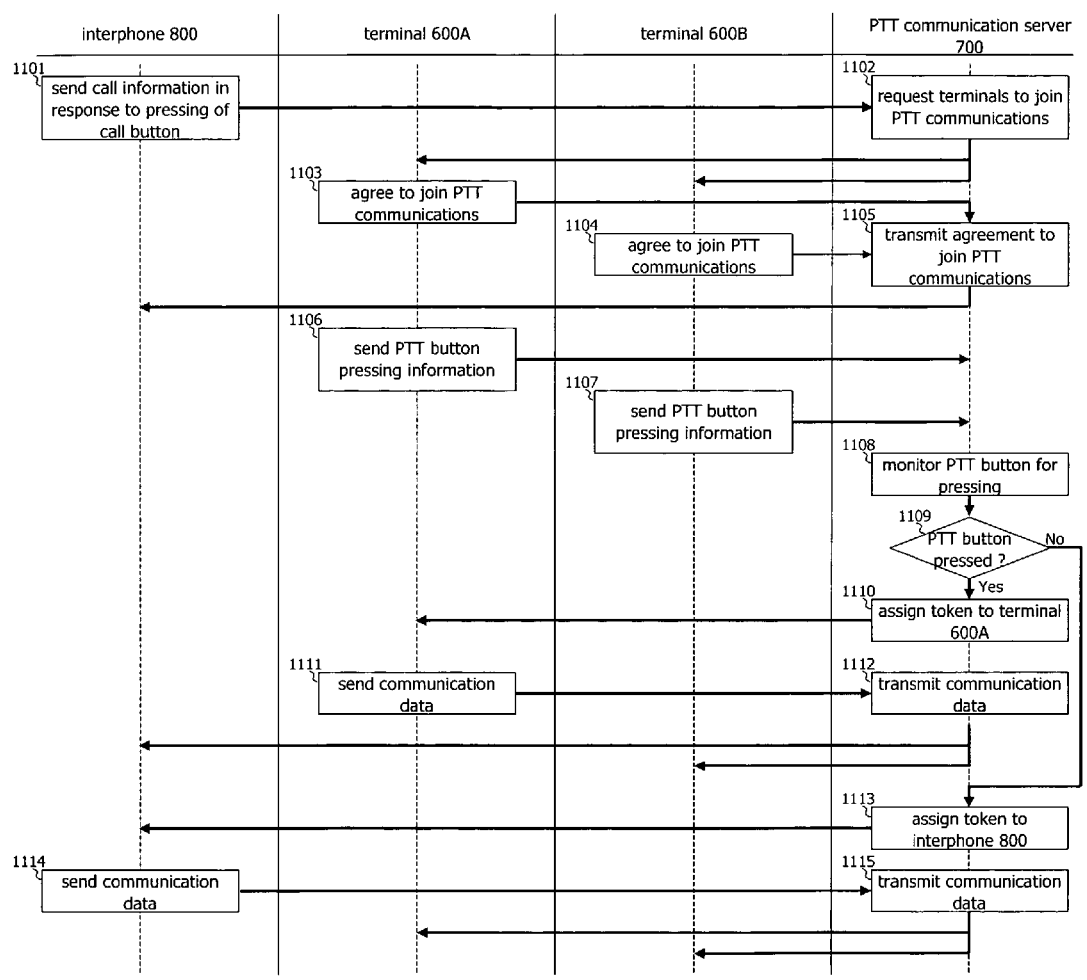
FIG. 11 is a flowchart of an operation sequence of the PTT communication system shown in FIG. 7.

Operation of the PTT communication system according to the second embodiment will be described below with reference to a flowchart shown in FIG. 11. It is assumed that group list manager 702 of PTT communication server 700 has already been managing the list of the PTT communication group including terminals 600A, 600B and interphone 800, and the profile information of the users using terminals 600A, 600B. An operation sequence for starting a PTT communication session triggered when call button 802-1 of interphone 800 is pressed will be described below.

In step 1101, when call button 802-1 is pressed, interphone 800 sends call information indicating that call button 802-1 is pressed through network 900 to PTT communication server 700. In step 1102, token controller 704 of PTT communication server 700 requests terminals 600A, 600B through network 900 to join PTT communications.

Upon the request, terminals 600A, 600B agree to PTT communication server 700 to join PTT communications through network 900, in response to a control action made by the user through control pad 602, in steps 1103, 1104. The agreement to join PTT communications is transmitted to interphone 800 by token controller 704 of PTT communication server 700 in step 1105.

Thereafter, interphone 800 and terminals 600A, 600B start a PTT communication session.

While interphone 800 and terminals 600A, 600B are performing PTT communications, terminal state indicators 607 of terminals 600A, 600B send information as to whether PTT buttons 602-1 are being pressed or not through network 900 to PTT communication server 700 in steps 1106, 1107.

In step 1108, terminal state monitor 703 of PTT communication server 700 monitors whether PTT button 602-1 of either one of terminals 600A, 600B is pressed or not, based on the information as to pressing of PTT button 602-1 which is received from each of terminals 600A, 600B through network 900.

It is assumed in step 1109 that PTT button 602-1 of terminal 600A is pressed. Token controller 704 of PTT communication server 700 assigns a token to terminal 600A until PTT button 602-1 thereof is released in step 1110. Subsequently, token controller 704 of PTT communication server 700 sends communication data transmitted from terminal 600A through network 900 in step 1111 through network 900 to terminal 600B and interphone 800 in step 1112. Terminal 600B and interphone 800 are inhibited from transmitting communication data.

If PTT button 602-1 of any one of terminals 600A, 600B is not pressed, then token controller 704 of PTT communication server 700 assigns a token to interphone 800 until PTT button 602-1 of either one of terminals 600A, 600B is pressed in step 1113. Subsequently, token controller 704 of PTT communication server 700 sends communication data transmitted from interphone 800 through network 900 in step 1114 through network 900 to terminals 600A, 600B in step 1115. Terminals 600A, 600B are inhibited from transmitting communication data.

According to the second embodiment, as described above, while PTT button 602-1 of any one of terminals 600A, 600B is not being pressed, a token is assigned to interphone 800 that is equipped with no PTT button, and communication data entered into interphone 800 are sent to terminals 600A, 600B. Consequently, interphone 800 that is equipped with no PTT button can join PTT communications.

When the resident is out of the residence, the resident can make itself look as if staying in the residence to a visitor who presses call button 8021 of interphone 800 to join PTT communications, by performing PTT communications using terminals 600A, 600B from out of the residence. Therefore, interphone 800 should preferably be of an appearance which looks like a general interphone free of PTT communication functions to visitors.

While preferred embodiments of the present invention have been described using specific terms, such description is for illustrative purposes only, and it is to be understood that changes and variations may be made without departing from the spirit or scope of the following claims.

What is claimed is:

1. A PTT communication system comprising:
    a plurality of terminals connected to a network and having respective PTT buttons for obtaining a token for PTT communications;
    a management server connected to said network, for managing advertisements or contents; and
    a PTT communication server connected to said network, for controlling a token for PTT communications;
    said PTT communication server comprising:
        terminal state monitoring means for monitoring pressed states of the PTT buttons of the respective terminals;
        token control means for assigning a token to one of the terminals whose PTT button is pressed and sending communication data transmitted from the terminal whose PTT button is pressed through said network, to another one of the terminals through said network, when the PTT button of said one of the terminals is pressed, and for assigning a token to said management server when the PTT button of any one of said terminals is not pressed; and
        distribution control means for distributing advertisements or contents selected by said management server to said terminals through said network when said token control means assigns a token to said management server.

2. A PTT communication system according to claim 1, wherein each of said terminals comprises:
    positional information calculating means for calculating positional information as to the present position of the terminal; and
    terminal state indicating means for indicating the pressed state of said PTT button of the terminal and the positional information as to the present position of the terminal to said PTT communication server through said network;
    said PTT communication server further comprising:
        managing means for managing profile information of users using said terminals, respectively;
    wherein said distribution control means sends the profile information of users using said terminals and the positional information as to the present positions of the terminals through said network to said management server when a token is assigned to said management server; and
    wherein said management server has selecting means for selecting advertisements or contents to be distributed to said terminals, based on at least one of the profile information of users using said terminals, the positional information as to the present positions of the terminals, and present time information, when a token is assigned to said management server by said PTT communication server, and for sending the selected advertisements or contents to said PTT communication server through said network.

3. A PTT communication system according to claim 2, wherein said selecting means selects advertisements or contents common to said terminals when a token is assigned to said management server by said PTT communication server.

4. A PTT communication system according to claim 2, wherein said selecting means selects advertisements or contents individually for said terminals when a token is assigned to said management server by said PTT communication server.

5. A PTT communication system according to claim 1, wherein said PTT communication server further comprises:
  distribution limiting time managing means for managing a distribution limiting time at which the distribution of advertisements or contents to said terminals is to be limited;
  wherein said distribution control means limits the distribution of advertisements or contents to said terminals if the present time corresponds to said distribution limiting time when said distribution control means is to distribute advertisements or contents to said terminals.

6. A PTT communication system according to claim 5, wherein said distribution limiting time managed by said distribution control means is set individually for each of said terminals.

7. A PTT communication system according to claim 5, wherein said distribution limiting time managed by said distribution control means is set by said management server.

8. A method of performing PTT communications in an PTT communication system having a plurality of terminals connected to a network and having respective PTT buttons for obtaining a token for PTT communications, a management server connected to said network, for managing advertisements or contents, and a PTT communication server connected to said network, for controlling a token for PTT communications, comprising the steps of:
  (a) indicating the pressed state of the PTT button of each of said terminals from each of said terminals through said network to said PTT communication server;
  (b) assigning a token from said PTT communication server to said management server when the PTT button of any one of said terminals is not pressed;
  (c) selecting advertisements or contents with said management server to which the token is assigned, and sending the selected advertisements or contents from said management server to said PTT communication server through said network; and
  (d) distributing the advertisements or contents selected by said management server to which the token is assigned, from said PTT communication server through said network to said terminals.

9. A method according to claim 8, further comprising the steps of:
  (e) calculating positional information of the present position of each of the terminals and sending the calculated positional information from each of the terminals through said network to said PTT communication server; and
  (f) sending profile information of users using said terminals and the positional information of said terminals through said network to said management server when said management server assigns a token to said management server;
  wherein in said step (c), said management server to which the token is assigned selects advertisements or contents to be distributed to said terminals, based on at least one of the profile information of users using said terminals, the positional information of the terminals, and present time information.

10. A method according to claim 9, wherein in said step (c), said management server to which the token is assigned selects advertisements or contents common to said terminals.

11. A method according to claim 9, wherein in said step (c), said management server to which the token is assigned selects advertisements or contents individually for said terminals.

12. A method according to claim 8, wherein in said step (d), if the present time corresponds to a distribution limiting time at which the distribution of advertisements or contents to said terminals is to be limited, said PTT communication server limits the distribution of advertisements or contents to said terminals.

13. A method according to claim 12, wherein said distribution limiting time is set individually for each of said terminals.

14. A method according to claim 12, wherein said distribution limiting time is set by said management server.

15. A PTT communication server for controlling a token for PTT communications between terminals and a management server for managing advertisements or contents, the PTT communication server comprising:
  terminal state monitoring means for monitoring pressed states of PTT buttons of respective terminals through a network;
  token control means for assigning a token to one of the terminals whose PTT button is pressed and sending communication data transmitted from the terminal whose PTT button is pressed through said network, to another one of the terminals through said network, when the PTT button of said one of the terminals is pressed, and for assigning a token to a management server connected to the network when the PTT button of any one of said terminals is not pressed; and
  distribution control means for distributing advertisements or contents selected by said management server to said terminals through said network when said token control means assigns a token to said management server.

16. A PTT communication server according to claim 15, further comprising:
  managing means for managing profile information of users using said terminals, respectively;
  wherein said terminal state monitoring means monitors positional information of said terminals through said network; and
  wherein said distribution control means sends the profile information of users using said terminals and the positional information of the terminals through said network to said management server when a token is assigned to said management server, to cause said management server to select advertisements or contents based on the sent information.

17. A PTT communication server according to claim 16, wherein said distribution control means distributes advertisements or contents selected commonly for said terminals by said management server, to said terminals through said network.

18. A PTT communication server according to claim 16, wherein said distribution control means distributes advertisements or contents selected individually for said terminals by said management server, to said terminals through said network.

19. A PTT communication server according to claim 15, further comprising:
   distribution limiting time managing means for managing a distribution limiting time at which the distribution of advertisements or contents to said terminals is to be limited;
   wherein said distribution control means limits the distribution of advertisements or contents to said terminals if the present time corresponds to said distribution limiting time when said distribution control means is to distribute advertisements or contents to said terminals.

20. A PTT communication server according to claim 19, wherein the distribution limiting time managed by said distribution limiting time managing means is set individually for said terminals.

21. A PTT communication server according to claim 19, wherein the distribution limiting time managed by said distribution limiting time managing means is set by said management server.

* * * * *